United States Patent
Matthews et al.

(10) Patent No.: US 9,041,718 B2
(45) Date of Patent: May 26, 2015

(54) SYSTEM AND METHOD FOR GENERATING BILINEAR SPATIOTEMPORAL BASIS MODELS

(75) Inventors: Iain Matthews, Pittsburgh, PA (US); Ijaz Akhter, Lahore (PK); Tomas Simon, Pittsburgh, PA (US); Sohaib Khan, Lahore (PK); Yaser Sheikh, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 37 days.

(21) Appl. No.: 13/425,369

(22) Filed: Mar. 20, 2012

(65) Prior Publication Data

US 2013/0249905 A1 Sep. 26, 2013

(51) Int. Cl.
G06T 17/00 (2006.01)
G06K 9/00 (2006.01)
G06T 13/20 (2011.01)
G06K 9/62 (2006.01)

(52) U.S. Cl.
CPC ............ *G06K 9/00335* (2013.01); *G06T 13/20* (2013.01); *G06K 9/6232* (2013.01)

(58) Field of Classification Search
USPC ........................................................ 345/475
See application file for complete search history.

(56) References Cited

U.S. PATENT DOCUMENTS

| | | | | |
|---|---|---|---|---|
| 7,224,853 | B1 * | 5/2007 | Moni ............................. | 382/300 |
| 2004/0001143 | A1 * | 1/2004 | Beal et al. ..................... | 348/169 |
| 2004/0208341 | A1 * | 10/2004 | Zhou et al. .................... | 382/103 |
| 2007/0103471 | A1 * | 5/2007 | Yang et al. .................... | 345/473 |

OTHER PUBLICATIONS

Akhter, et al. "Nonrigid Structure form Motion in Trajectory Space," Neural Information Processing Systems, Dec. 2008, pp. 1-8.
Akhter, et al., "Trajectory Space: A Dual Representation for Nonrigid Structure from Motion," IEEE Transactions on Pattern Analysis and Machine Intelligence, vol. 33, No. 7, Jul. 2011, pp. 1442-1456.
Okan Arikan, "Compression of Motion Capture Databases," Association for Computing Machinery, Inc., 2006, pp. 890-897.
Gotardo, et al., "Computing Smooth Time Trajectories for Camera and Deformable Shape in Structure from Motion with Occlusion," IEEE Transactions on Pattern Analysis and Machine Intelligence, vol. 33, No. 10, Oct. 2011, pp. 2051-2065.
Hamarneh, et al., "Deformable spatio-temporal shape models: Extending active shape models to 2D + time," Elsevier Computer Science, Image and Vision Computing 22 (2004), pp. 461-470.
Li, et al., "BoLeRO: A Principled Technique for Including Bone Length Constraints in Motion Capture Occlusion Filing," (2010). Computer Science Department, Paper 1251 (http://repository.cmu.edu/compsci/1251 (11 pages).

(Continued)

*Primary Examiner* — Mark Zimmerman
*Assistant Examiner* — Sohum Kaji
(74) *Attorney, Agent, or Firm* — Patterson & Sheridan LLP

(57) ABSTRACT

Techniques are disclosed for generating a bilinear spatiotemporal basis model. A method includes the steps of predefining a trajectory basis for the bilinear spatiotemporal basis model, receiving three-dimensional spatiotemporal data for a training sequence, estimating a shape basis for the bilinear spatiotemporal basis model using the three-dimensional spatiotemporal data, and computing coefficients for the bilinear spatiotemporal basis model using the trajectory basis and the shape basis.

21 Claims, 9 Drawing Sheets

(56) References Cited

OTHER PUBLICATIONS

Lou, et al., "Example-based Human Motion Denoising," IEEE Transactions on Visualization and Computer Graphics, (2009) pp. 1-11.

Mardia, et al., "Shape Distributions for Landmark Data," Adv. Appl. Prob. 21, 742-755 (1989), Applied Probability Trust 1989 pp. 742-755.

Park, et al., "Capturing and Animating Skin Deformation in Human Motion,", Association for Computing Machinery, Inc., 2006 pp. 881-889.

Tenenbaum, et al., "Separating style and content with bilinear models," Mitsubishi Electric Research Laboratories, Dec. 1999, pp. 1-49 (53 pages total).

Troje, Nikolaus F., "Decomposing biological motion: A framework for analysis and synthesis of human gait patterns," Journal of Vision (2002) 2, 371-387.

Urtasun, et al., "Style-Based Motion Synthesis," Computer Graphics forum vol. 23 (2004, No. 4, pp. 799-812.

Wang, Jack M., "Gaussian Process Dynamical Models for Human Motion," IEEE Transactions on Pattern Analysis and Machine Intelligence, vol. 30 No. 2 Feb. 2008, pp. 283-298.

\* cited by examiner

SYSTEM AND METHOD FOR GENERATING BILINEAR SPATIOTEMPORAL BASIS MODELS

FIELD OF THE INVENTION

Embodiments of the present invention relate to the field of computer graphics and, in particular, to generating a bilinear spatiotemporal basis model.

BACKGROUND

Description of the Related Art

A variety of dynamic objects, such as faces, bodies, and cloth, are represented in computer graphics as a collection of moving spatial landmarks that may be represented as spatiotemporal data. Spatiotemporal data is inherent in a number of graphics applications including animation, simulation, and object and camera tracking. The principal modes of variation in the spatial geometry of objects are typically modeled using dimensionality reduction techniques, while concurrently, trajectory representations such as splines and autoregressive models are widely used to exploit the temporal regularity of deformation of the objects. Conventional modeling techniques for spatiotemporal data are difficult to compute. Additionally, conventionally generated models of spatiotemporal data require significant amounts of memory.

SUMMARY

One embodiment of the disclosure sets forth a method for generating a bilinear spatiotemporal basis model. The method includes the steps of providing a trajectory basis for the bilinear spatiotemporal basis model, receiving three-dimensional spatiotemporal data for a training sequence, estimating a shape basis for the bilinear spatiotemporal basis model using the three-dimensional spatiotemporal data, and computing coefficients for the bilinear spatiotemporal basis model using the trajectory basis and the shape basis.

Another embodiment of this disclosure sets forth a computer-readable medium storing instructions that, when executed by a processing unit, cause the processing unit to perform operations for generating a bilinear spatiotemporal basis model. The operations include providing a trajectory basis for the bilinear spatiotemporal basis model, receiving three-dimensional spatiotemporal data for a training sequence, estimating a shape basis for the bilinear spatiotemporal basis model using the three-dimensional spatiotemporal data, and computing coefficients for the bilinear spatiotemporal basis model using the trajectory basis and the shape basis.

Yet another embodiment of this disclosure sets forth a system for generating a bilinear spatiotemporal basis model. The system includes a processing unit that is coupled to a memory configured to store three-dimensional spatiotemporal data for a training sequence and coefficients for the bilinear spatiotemporal basis model. The processing unit is configured to: provide a trajectory basis for the bilinear spatiotemporal basis model, receive the three-dimensional spatiotemporal data for the training sequence, estimate a shape basis for the bilinear spatiotemporal basis model using the three-dimensional spatiotemporal data, and compute the coefficients for the bilinear spatiotemporal basis model using the trajectory basis and the shape basis.

One advantage of the techniques described herein is that the bilinear spatiotemporal basis is a model that simultaneously exploits spatial and temporal regularity while maintaining the ability to generalize well to new sequences. The bilinear spatiotemporal model can be interpreted as representing the data as a linear combination of spatiotemporal sequences where the coefficients of the shape basis change over time at key frequencies. This factorization allows the use of analytical, predefined functions to represent temporal variation (e.g., B-Splines or the Discrete Cosine Transform) resulting in more efficient model representation and estimation. The bilinear spatiotemporal model may be applied to natural spatiotemporal phenomena, including face, body, and cloth motion data. The bilinear spatiotemporal model may also be applied to a number of graphics tasks including labeling, gap-filling, de-noising, and motion touch-up. In sum, the bilinear spatiotemporal model provides a compact representation of the spatiotemporal data that may be generalized and used to accurately predict additional spatiotemporal data.

BRIEF DESCRIPTION OF THE DRAWINGS

A more particular description of the invention, briefly summarized above, is illustrated in the appended drawings. The appended drawings illustrate only typical embodiments of this invention and are therefore not to be considered limiting of its scope, for the invention may include other equally effective embodiments.

DETAILED DESCRIPTION OF EXEMPLARY EMBODIMENTS

Figure 1A:
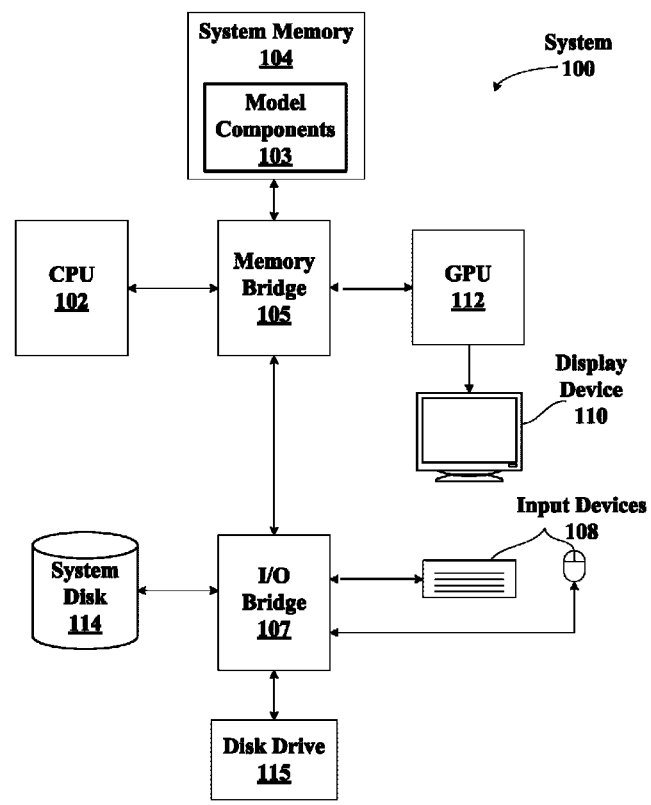
FIG. 1A is a block diagram of a system configured to implement one or more aspects of the present disclosure.

Embodiments of the invention provide techniques for generating a bilinear spatiotemporal basis model. A variety of dynamic objects, such as faces, bodies, and cloth, are represented in computer graphics as a collection of moving spatial landmarks. Spatiotemporal data is inherent in a number of graphics applications including animation, simulation, and object and camera tracking. The bilinear spatiotemporal basis is a model that simultaneously exploits spatial and temporal regularity while maintaining the ability to generalize well to new sequences. The bilinear spatiotemporal basis model can be interpreted as representing the data as a linear combination of spatiotemporal sequences consisting of shape modes oscillating over time at key frequencies. This factorization allows the use of analytical, predefined functions to represent temporal variation (e.g., B-Splines or the Discrete Cosine Transform) resulting in more efficient model representation and estimation. The bilinear spatiotemporal basis model may be applied to natural spatiotemporal phenomena, including face, body, and cloth motion data.

One embodiment of the disclosure is a method for generating a bilinear spatiotemporal basis model. The method includes the steps of providing a trajectory basis for the bilinear spatiotemporal basis model, receiving three-dimensional spatiotemporal data for a training sequence, estimating a shape basis for the bilinear spatiotemporal basis model using the three-dimensional spatiotemporal data, and computing coefficients for the bilinear spatiotemporal basis model using the trajectory basis and the shape basis.

Time varying spatial data is widely used to represent animated characters in computer games, marker data in motion capture, and surface meshes in physical simulators. A bilinear spatiotemporal model may be generated that represents time-varying spatial data as a linear combination of spatiotemporal sequences, each of which may be intuitively interpreted as shape modes oscillating over time at key frequencies. The bilinear spatiotemporal model may be expressed in a simple bilinear form, which separately but simultaneously exploits both the spatial and the temporal regularities that exist in data. The separation between the spatial and the temporal modes enables conditioning of the bilinear spatiotemporal model by leveraging analytical trajectory bases, such as the discrete cosine transform (DCT) or B-splines. Such conditioning allows the bilinear spatiotemporal model to generalize well to spatiotemporal sequences of arbitrary length from a small number of training sequences while remaining tractable and highly compact.

The reconstruction error of the bilinear spatiotemporal model may be controlled, and the bilinear spatiotemporal model performs well in terms of compaction, generalization ability, computational efficiency, and predictive precision compared with conventional techniques, e.g., linear dynamical models, shape basis models, splines, trajectory basis models, and linear spatiotemporal basis models.

Furthermore, the generated bilinear spatiotemporal model may be applied to expectation maximization, and used to perform a number of analysis tasks, such as data labeling, de-noising, gap-filling, and editing for face, body, and cloth data.

System Overview

FIG. 1A is a diagram illustrating an example system 100 for generating and playing back dynamic models. The system 100 may be configured to generate animation sequences in real-time or for playback. The system 100 may also be configured to execute a game and to generate animations during execution of the game. The system 100 is further configured to accept and process input from a user and to provide data for displaying the results of such user input.

The user inputs commands using input devices 108. The input devices 108 may be any device that allows the user to interact with the system 100. For example, the input device 108 may comprise a keyboard, a joystick, a controller, a microphone, a camera, a keypad, or a series of buttons, among other devices and features. The system 100 outputs graphics and animations to a display device 110, which may be any device that receives data for display and presents it visually to the user. For example, the display device 110 may include a cathode ray tube, a plurality of light emitting diodes (LEDs), a liquid crystal display (LCD), a portable video game console, or a projector, among other devices and features.

The system 100 includes a central processing unit (CPU) 102 that is in communication with the input devices 108 through an input/output (I/O) bridge 107. The CPU 102 communicates with a graphics processing unit (GPU) 112 through a memory bridge 105 to generate images that are output to the display device 110. In some embodiments, one or more of the GPU 112, CPU 102, I/O bridge 107, and memory bridge 105 are integrated into a single device. The system 100 may further include a system memory 104 in communication with the CPU 102 through the memory bridge 105. The CPU 102 is configured to retrieve and execute programming instructions stored in the system memory 104 and system disk 114. Similarly, the CPU 102 is configured to store and retrieve application data residing in the system memory 104 and system disk 114.

The system memory 104 may comprise certain types of random access memory (RAM) such as dynamic random access memory (DRAM) or static random access memory (SRAM), or may comprise any other type of volatile memory. The volatile memory 104 may be used to store data and/or instructions during operation of the CPU 102. In particular, the system memory 104 may store model components 103 that are used to generate a bilinear spatiotemporal model and/or spatiotemporal sequences based on the bilinear spatiotemporal model. In other embodiments the model components 103 are stored in the system disk 114. Those skilled in the art will recognize other types of memory and uses thereof.

The system 100 may further include a non-volatile system disk 114 that is in communication with the CPU 102 through the I/O bridge 107 and memory bridge 105. The system disk 114 may include flash memory, magnetic storage devices, hard disks, or read-only memory (ROM) such as erasable programmable read-only memory (EPROM), or any other type of non-volatile memory. The system disk 114 may be used to store games, instructions, or any other information that is to be retained if power to the system 100 is removed. The system 100 may comprise an interface to install or temporarily locate additional non-volatile memory. Those skilled in the art will recognize other types of non-volatile memory and uses thereof.

The GPU 112 is configured to render data supplied by the CPU 102 for display on the display device 110. The GPU 112 may be configured to perform any number of functions related to providing data for display on the display device 110. For example, the GPU 112 may be configured to render a plurality of polygons, apply shading or texture, create data representative of a three-dimensional environment, or convert between coordinate spaces, among other functions. Those skilled in the art will recognize other configurations and functionalities of the GPU 110.

The system 100 may further include a disc drive 115 in communication with the CPU 102. The CPU 102 may read data from a disc inserted into the disc drive 115. In some embodiments, the system 100 is configured to record data on the disc using the disc drive 115. In this way, data relating to animation may be transported to or from the system 100. Alternatively, animation data may be transmitted to/from system 100 via a network.

The system 100 is not limited to the devices, configurations, and functionalities described above. For example, although a single volatile memory, non-volatile memory, GPU 112, disc drive 115, input device 108, and display device 110 are illustrated, a plurality of any of these devices may be implemented internal or external to the system 100. In addition, the system 100 may comprise a power supply or a network access device. Those skilled in the art will recognize other such configurations of the system 100. Other components (not explicitly shown), including USB or other port connections, CD drives, DVD drives, film recording devices, and the like, may also be connected to I/O bridge 107. Communication paths interconnecting the various components in FIG. 1A may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

Graphics and animations for display by the system 100 can be created using any number of methods and devices. A variety of commercially available modeling software may be used to generate graphics and animations representing a three-dimensional environment. Using such software, bilinear spatiotemporal models may be generated and animation sequences may be produced using the bilinear spatiotemporal model to provide data for display on the display device 110.

Figure 1B:
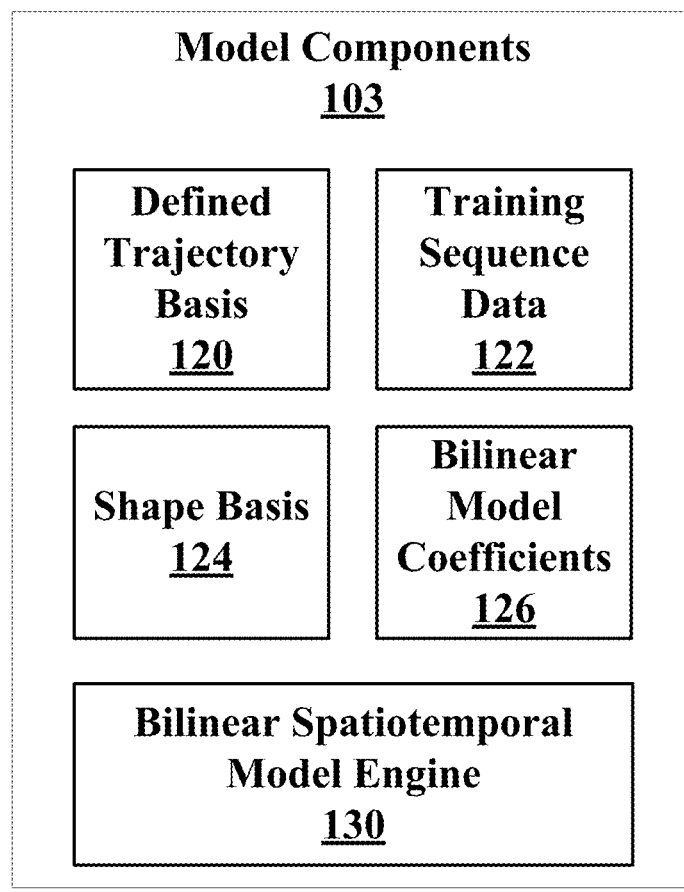
FIG. 1B is a block diagram of the model components of FIG. 1A that are configured to implement one or more aspects of the present disclosure.

FIG. 1B is a block diagram of the model components 103 of FIG. 1A that are configured to implement one or more aspects of the present disclosure. The model components 103 comprise bilinear spatiotemporal model engine 130 including instructions or data that can be used to generate a bilinear spatiotemporal model. In particular, the bilinear spatiotemporal model engine 130 may generate a bilinear spatiotemporal model that is used by an application program to perform a number of analysis tasks, such as data labeling, de-noising, gap-filling, and editing for time-varying spatial data.

Inputs to the bilinear spatiotemporal model engine 130 may include a defined trajectory basis 120 and training sequence data 122. The bilinear spatiotemporal model engine 130 may be configured to generate a shape basis 124 and bilinear model coefficients 126 of the bilinear spatiotemporal model when the bilinear spatiotemporal model engine 130 is executed by the CPU 102 and/or GPU 112. The defined trajectory basis 120 is a known temporal basis, e.g., DCT, that is used to precondition the bilinear spatiotemporal model. The training sequence data 122 is used by the bilinear spatiotemporal model engine 130 to compute the shape basis 124. The shape basis 124 and defined trajectory basis 120 are then used by the bilinear spatiotemporal model engine 130 to compute the bilinear model coefficients 126. Collectively, the shape basis 124, defined trajectory basis 120, and the bilinear model coefficients 126 define the bilinear spatiotemporal model.

The spatiotemporal model that is defined by the defined trajectory basis 120, shape basis 124, and bilinear model coefficients 126 is compact and may be used to reconstruct missing data in the training sequence data 122, to predict additional frames for a sequence, or to edit data in a sequence and generate a new sequence incorporating the edit. The spatiotemporal model may be used by an application program to cleanup dense facial motion capture data, creating an output that has consistent marker labeling and no missing or noisy markers.

Another application may use the spatiotemporal model to perform imputation (interpolation) by allowing a user to edit the motion of motion captured human body data. By defining a few constraints (key points) in a sequence, the spatiotemporal model is used by the bilinear spatiotemporal model engine 130 to generate a new sequence that is spatially and dynamically consistent with the original spatiotemporal model. For example, when the upper body position of a football player is repositioned to header a ball at a chosen point in a sequence so that he does not miss the ball, the spatiotemporal model is used to generate a new sequence in which he successfully headers the ball instead of missing the ball. The same space-time editing approach may be applied to cloth, or any other type of simulation data that is spatially consistent over time.

Figure 2:
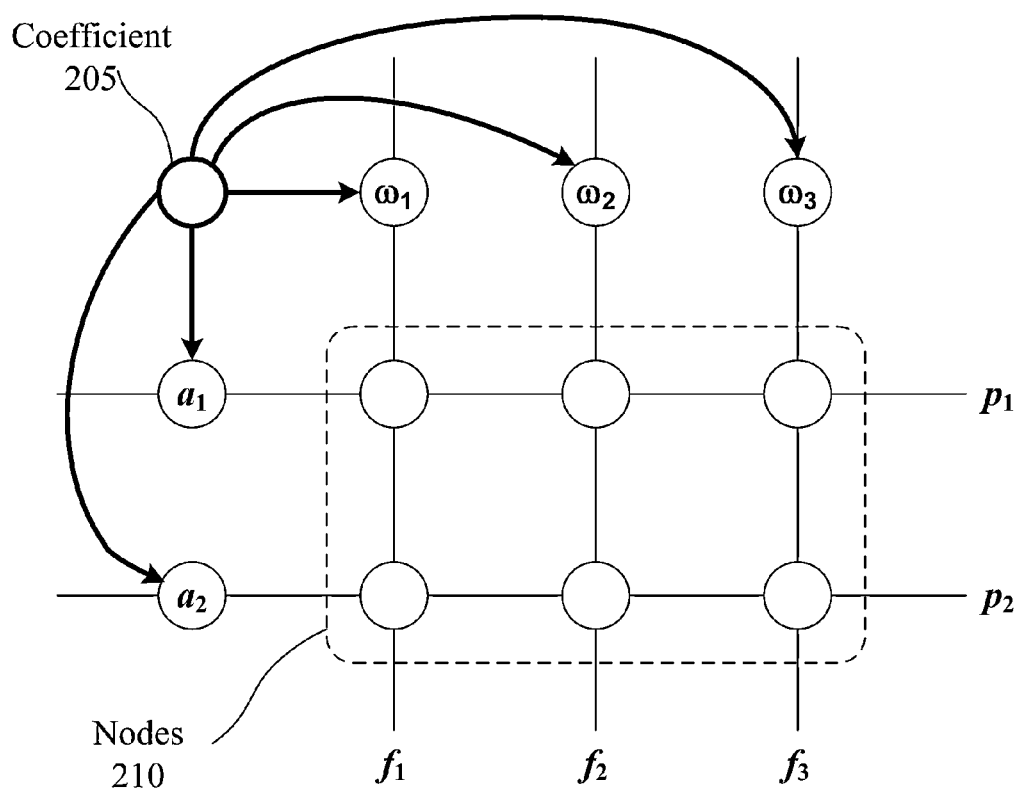
FIG. 2 illustrates a graphical model showing parameter dependencies for a bilinear spatiotemporal model, according to one example embodiment of the present disclosure.

FIG. 2 illustrates a graphical model showing parameter dependencies for a bilinear spatiotemporal model, according to one example embodiment of the present disclosure. In FIG. 2, $p_i$ refers to a particular point index, $f_i$ refers to a particular time frame, $\omega_i$ is a shape coefficient at time $f_i$, and $a_i$ is a trajectory coefficient associated with $p_i$. Coefficient 205 is one coefficient of a bilinear spatiotemporal model, e.g., one coefficient of the bilinear model coefficients 126.

The time-varying structure of a set of P points sampled at F time instance can be represented as a concatenated sequence of three-dimensional (3D) points:

$$S_{F \times 3P} = \begin{bmatrix} X_1^1 & \ldots & X_P^1 \\ \vdots & \ddots & \vdots \\ X_1^F & \ldots & X_P^F \end{bmatrix}, \quad \text{(equation 1)}$$

where $X_j^i = [X_j^i, Y_j^i, Z_j^i]$ denotes the 3D coordinates of the j-th point at the i-th time instance (where the row-index is a superscript and the column-index is subscript) are shown as nodes 210. Thus, the time-varying structure matrix S contains 3F P parameters. This representation of the structure is an over-parameterization because it does not take into account the high degree of regularity generally exhibited by motion data.

Some conventional techniques exploit the regularity in spatiotemporal data as a linear combination of weighted shape basis vectors bj at each time instance in a sequence. Another conventional technique is to represent the time-varying structure as a linear combination of weighted trajectory basis vectors $\theta_i$ at each point across the frames in a sequence.

Using a shape basis or a trajectory basis independently fails to exploit the full range of generalizable spatiotemporal regularities. In the shape basis representation, the temporal regularity of trajectories is ignored; removing temporal regularity by shuffling the frames in time to form a random arrangement only results in a corresponding shuffling of the weighting coefficients. The same is true for the trajectory basis representation, in which case each spatial location is treated independently; hence, the spatial ordering of the points becomes immaterial. Thus, both representations are over-parameterizations because they do not capitalize on either the spatial or the temporal regularity. In contrast, the bilinear spatiotemporal model uses a bilinear representation of the complete structure matrix, S, linking both shape and trajectory bases in a single model, namely, the bilinear spatiotemporal model. The following theorem illustrates how both the shape bases B and the trajectory bases Θ are linked in the single bilinear spatiotemporal model.

Theorem 1: If S can be expressed exactly as $$S = \Omega B^T \quad \text{(equation 3)}$$

$\Omega$ is an F×$K_s$ matrix containing the corresponding shape coefficients $\omega_j^i$, representing all of the points at a particular time. B is a 3P×$K_s$ matrix containing $K_s$ shape basis vectors, each representing a 3D structure of length 3P. S can also be expressed as $$S = \Theta A^T, \quad \text{(equation 5)}$$

where $\Theta$ is an F×$K_t$ matrix containing $K_t$ trajectory basis vectors as its columns, and A is a 3P×$K_t$ matrix of trajectory coefficients. Then there exists a factorization, $$S = \Theta C B^T, \quad \text{(equation 6)}$$

where $C = \Theta^T \Omega = A^T B$ is a $K_t \times K_s$ matrix of spatiotemporal coefficients. For clarity, theorem 1 is stated assuming orthogonal bases. Equivalent proofs for non-orthogonal bases can be derived by using the pseudo-inverses of $\Theta$ and B instead of transposes.

Proof: Equating the two forms of S in Equations 3 and 5 yields $\Omega B^T = \Theta A^T$. It follows that $A^T = \Theta^T \Omega B^T$. Substituting this into Equation 5 yields $S = \Theta \Theta^T \Omega B$. Defining $C = \Theta^T \Omega$, then $S = \Theta C B^T$. The same result can be derived in a dual fashion by substituting $\Omega = \Theta A^T B$ in Equation 3 and yielding $C = A^T B$.

Equation 6 describes the bilinear spatiotemporal basis, which contains both shape and trajectory bases linked together by a common set of coefficients C. These coefficients can be visualized in two equivalent ways as indicated by the two definitions of C given above: (1) $C = \Theta^T \Omega$ implies the projection of shape coefficients $\Omega$ onto the trajectory basis, $\Theta$, and (2) $C = A^T B$ implies the projection of trajectory coefficients A onto the shape basis B.

For an intuitive understanding of the bilinear spatiotemporal model, consider the coefficient $c_j^i$ at the i-th row and the j-th column in C (coefficient 205 in FIG. 2). The coefficient represents the weight of the outer product of the i-th trajectory basis vector, $\theta_i$, and the j-th shape basis vector, $b_j$. The outer product will result in a time-varying structure sequence in which all points of a single shape mode (as defined by the j-th shape basis) will vary over time (as defined by the i-th trajectory basis). The sum of all such outer products $\theta_i b_j^T$, weighted by the corresponding coefficient, $c_j^i$, results in the bilinear representation of S, equivalent to Equation 6:

$$S = \Sigma_i \Sigma_j c_j^i \theta_i b_j^T. \quad \text{(equation 7)}$$

The bilinear representation of S is best illustrated as an animation of each shape basis vector $b_j$ modulated over time according to each trajectory basis vector $\theta_i$.

In Theorem 1, the bilinear spatiotemporal model is derived for the case of perfect representation of time-varying structure. The bilinear basis (Equation 6) may also be used with a reduced number of basis vectors. In the following theorem, bounds on the bilinear spatiotemporal model error are described as a function of approximation errors of the shape and trajectory models.

Theorem 2: If the reconstruction error of the trajectory model is $\epsilon_t = \|S - \Theta A^T\|_F$, and the error of the shape model is $\epsilon_s = \|S - \Omega B^T\|_F$, then the error of the bilinear spatiotemporal model $\epsilon = \|S - \Theta C B^T\|_F$ is upper bound by $\epsilon_t + \epsilon_s$ and lower bound by $\max(\epsilon_t, \epsilon_s)$, where $\|.\|_F$ is the Frobenius norm.

Proof: The approximate model may be expressed as, $$S = \Theta A^T + \Theta^\perp A^\perp, \quad \text{(equation 8)}$$

$$S = \Omega B^T + \Omega^\perp B^{\perp T}, \quad \text{(equation 9)}$$

where the columns of $\Theta^\perp$ and $B^\perp$ form a basis for the nullspaces of $\Theta^T$ and $B^T$ respectively. $A^\perp$ and $\Omega^\perp$ are the coefficients of these nullspaces. Here $\epsilon_t = \|\Theta^\perp A^\perp\|_F$ and $\epsilon_s = \|\Omega^\perp B^{\perp T}\|_F$. Setting Equations 8 and 9 equal and noting $\Theta^T \Theta^\perp = 0$ produces $$S = \Theta C B^T + \Theta \Theta^T \Omega^\perp B^{\perp T} + \Theta^\perp A^\perp. \quad \text{(equation 10)}$$

Theorem 2 states that the bilinear spatiotemporal model error cannot exceed the sum of errors of the shape and trajectory models. This error, however, is advantageously reached with far fewer coefficients for the bilinear spatiotemporal model as compared to the conventional shape or trajectory models.

In addition to requiring fewer coefficients, the bilinear spatiotemporal model may also require less training data compared with the conventional shape or trajectory models. While the linear and bilinear spatiotemporal models can model both spatial and temporal regularity, linear spatiotemporal bases may need substantial amounts of data to generalize beyond sequence-specific correlations. The linear basis learns any correlation within the fixed spatiotemporal window, whereas the bilinear basis must be separable. This becomes crucial when learning from sequences that are not temporally aligned—for example, facial motion from utterances of different speech content.

While shape basis B is based on the training data, the high degree of temporal smoothness in natural motions allows a defined analytical trajectory basis to be used for a wide variety of datasets without a significant loss in representation. The conditioned bilinear spatiotemporal representation is thus a special case of Equation 6, $$S = \Theta C B^T + \epsilon, \quad \text{(equation 11)}$$

Where $\Theta$ contains the first $K_t$ basis arranged along its columns, each of length F. The ability to use a predefined trajectory basis yields closed form and numerically stable solutions, for both the estimation of the shape basis and coefficients in Equation 6. The benefit of using a trajectory basis for which an analytical expression exists is that the same model can represent time-varying structures of arbitrary durations. A particularly suitable choice of a conditioning trajectory basis is the Discrete Cosine Transform (DCT) basis.

Figure 3:
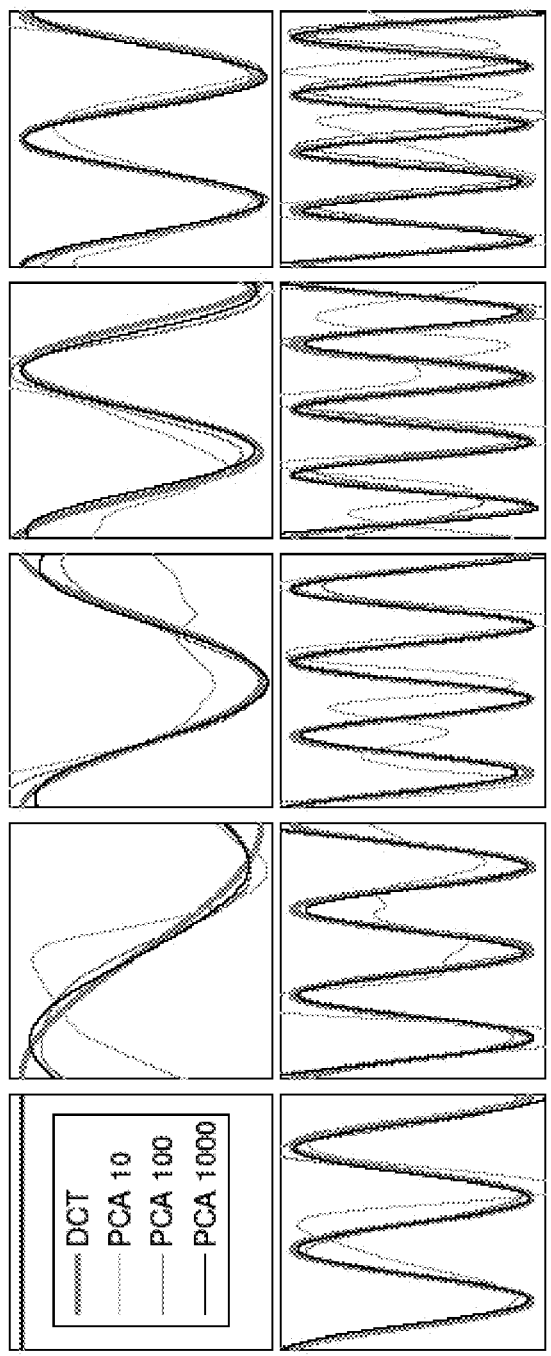
FIG. 3 illustrates a comparison of the first 10 discrete cosine transform (DCT) basis vectors with the first 10 data-specific PCA trajectory basis vectors learned on a varying number of facial motion capture training sequences, according to one example embodiment of the present disclosure.

FIG. 3 illustrates a comparison of the first 10 DCT basis vectors with the first 10 data-specific principal component analysis (PCA) trajectory basis vectors learned on a varying number of facial motion capture training sequences, according to one example embodiment of the present disclosure. For large training sets of natural motion (including non-periodic motion), the PCA-learned trajectory basis approaches DCT. Ordered left-to right, top-to-bottom, comparison of the first 10 DCT basis vectors with the first 10 data-specific PCA trajectory basis vectors learned on a varying number of facial motion capture training sequences: 10 sequences (light gray), 100 sequences (dark gray), and 1000 sequences (black). Each sequence and each vector depicted in FIG. 3 is 100 frames in length. The first 10 DCT basis vectors are a close approximation to the PCA trajectory basis vectors learned on 1000 facial motion capture training sequences.

Choices of a conditioning trajectory basis other than a DCT are possible and may be preferable in specific applications. While DCT shows compaction that is close to optimal, the support of each basis vector is global, and each coefficient affects the entire sequence. This may be undesirable in some cases, and therefore overlapped-block versions such as the modified DCT are often used in online signal processing tasks. A practical alternative with localized basis support is the B-spline basis that is most commonly used to approximate smooth functions while offering local control over the shape of the curve. The B-spline basis is not orthogonal, which results in a slightly more expensive solution for estimating the coefficients.

In one aspect, using a defined trajectory basis, such as the DCT, is advantageous because the complexity of estimating bilinear bases is reduced to being nearly identical to that of shape-only models, and because the bilinear spatiotemporal model also provides good generalization capabilities, and the ability to handle sequences of arbitrary duration. In contrast, for the linear spatiotemporal model given in Equation 11, the spatial and the temporal components do not factor out separately, and hence it is not possible to use a defined basis for one mode of variation and a data-driven basis for the other.

The principal difference between the technique used to generate the bilinear spatiotemporal model and conventional techniques is that some conventional techniques factor the coefficients into separate bilinear terms which are combined by a shared mixing basis. In contrast, the spatiotemporal model is generated by factoring the basis into spatial and temporal variations and unifying the coefficients. Restating, the conventional approach computes bilinear factorizations of the coefficients of each sample, while the bilinear spatiotemporal model is linear in coefficients and a bilinear factorization of the basis.

From a practical perspective, this difference allows the bilinear spatiotemporal model to be generated using a least squares estimation of the coefficients rather than requiring nonlinear iterative minimization. When the bilinear spatiotemporal model is conditioned using a defined trajectory basis, a closed form solution is allowed for estimation of the bilinear spatiotemporal model. From a conceptual perspective, because the bilinear spatiotemporal model is conditioned using DCT, the bilinear spatiotemporal model encodes a spatiotemporal sequence as a linear combination of spatial modes of variation oscillating at key frequencies.

A strength of the conditioned bilinear spatiotemporal model is that the estimation of coefficients and basis have closed form solutions requiring only linear least squares and singular value decomposition routines. Hence, the estimation is efficient, optimal, and numerically stable. Given an estimated shape basis B and a trajectory basis $\Theta$, the bilinear model coefficients C, that minimize the reconstruction error for a given S are computed. The solution may be estimated by minimizing the squared reconstruction error:

$$C = \underset{C}{\operatorname{argmin}} \|(S - \Theta C B^T)\|_F^2 \qquad \text{(equation 14)}$$

For any bases $\Theta$ and B, the general solution for optimal C is in terms of the pseudo-inverses $$C = \Theta^T S (B^T)^+ \qquad \text{(equation 15)}$$

where superscripted + denotes the Moore-Penrose pseudo-inverse. For the case when both $\Theta$ and B have full column-rank, the above solution is unique. If the bases are orthogonal, then the solution simplifies to $C = \Theta^T S B$, which implies simply projecting the structure S onto each of the bases sequentially. The simplification when the bases are orthogonal applies to the DCT basis, but not to the B-spline basis, since the B-spline basis is not orthonormal.

The shape basis, B may be estimated using higher-order singular value decomposition or iterative singular value decomposition; however, the estimation of the conditioned bilinear bases is significantly simpler because the trajectory bases are already known. Hence, given a set of training examples, the appropriate shape basis for the bilinear spatiotemporal model may be estimated using the following theorem.

Theorem 3: Given a trajectory basis $\Theta$ and a set of N training sequences of time-varying structure, $S_1, S_2, \ldots, S_N$, the optimal shape basis which minimizes the squared reconstruction error is given by the row-space computed through singular value decomposition of the stacked matrix, $$\Pi = [\hat{S}_1^T, \hat{S}_2^T, \ldots, \hat{S}_N^T]^T, \qquad \text{(equation 16)}$$

where $\hat{S}_i = \Theta \Theta^+ S_i$ denotes the reconstruction of S after projection into the trajectory basis.

Proof: For one sequence, expanding S into its components that span the trajectory basis and its null space, $$\underset{B}{\operatorname{argmin}} \|\Theta \Theta^+ S + \Theta^\perp A^\perp - \Theta \Theta^+ S (B^T)^+ B^T\|_F^2 \qquad \text{(equation 17)}$$

Observing that, for a fixed $\Theta$, $\Theta^\perp A^\perp$ does not depend on the choice of B, then the optimal rank-$K_s$ orthogonal B can be computed as the row space of $\hat{S}$ via singular value decomposition. For more than one structure sequence, the optimal shape basis B will result from the singular value decomposition of the matrix formed by stacking the N training sequences $\hat{S}_i$ into a FN×3P matrix $\Pi$, defined in equation 16, where F is the number of frames in each training sequence and P is the number of points in each frame. The error to be minimized is equivalent to $\|\Pi - \Pi(B^T)^+ B^T\|_F^2$.

Figure 4:
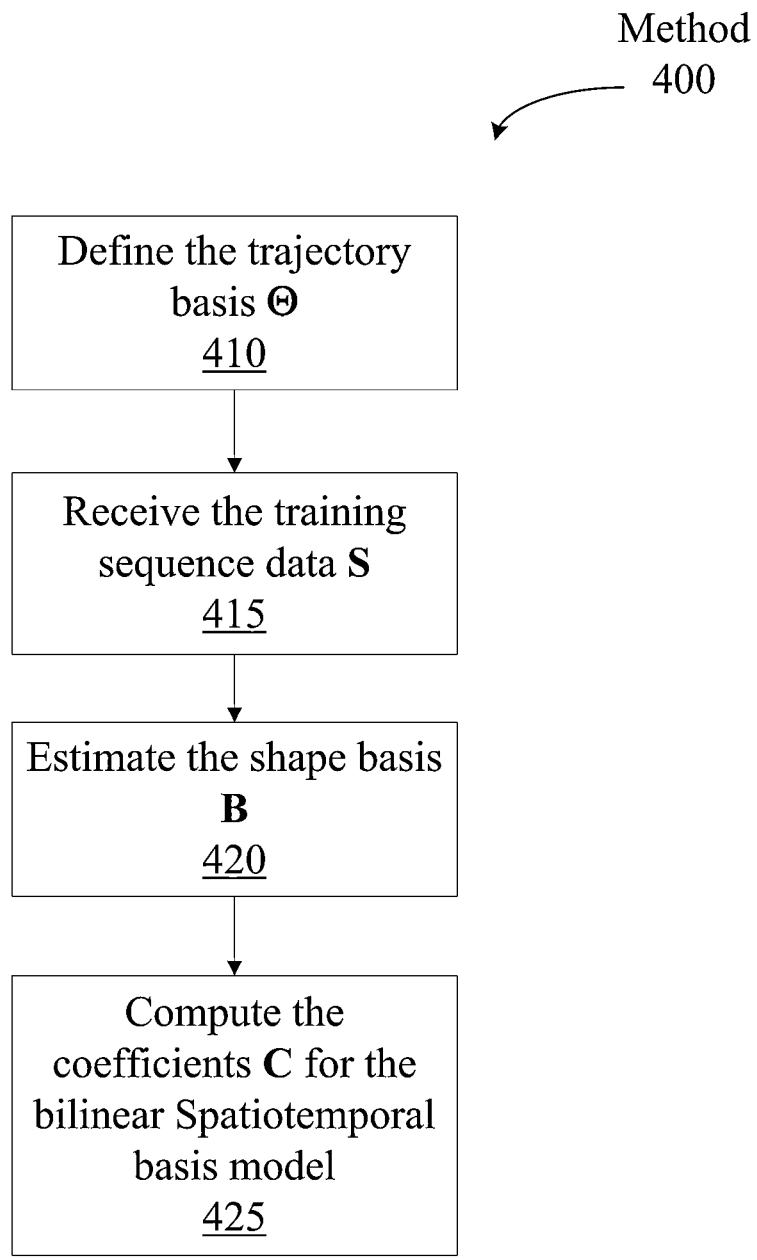
FIG. 4 is a flow diagram of method steps for generating a bilinear spatiotemporal model, according to one example embodiment of the present disclosure.

FIG. 4 is a flow diagram of method steps for generating a bilinear spatiotemporal model, according to one example embodiment of the present disclosure. Persons skilled in the art would understand that, even though the method is described in conjunction with the systems of FIGS. 1A and 1B, any system configured to perform the method steps, in any order, is within the scope of embodiments of the invention.

The method 400 begins at step 410, when a defined trajectory basis 120, is defined for a bilinear spatiotemporal model. At step 415, a processing unit, such as the CPU 102, configured to execute the bilinear spatiotemporal model engine 130, receives the training sequence data 122. In one embodiment, DCT is used for the defined trajectory basis 120. At step 420, the bilinear spatiotemporal model engine 130 configures the processing unit to estimate the shape basis 124 using the training sequence data 122. In one embodiment, the shape basis is estimated to minimize the squared reconstruction error using equation 16. At step 425, the bilinear spatiotemporal model engine 130 configures the processing unit to compute the bilinear model coefficients 126 for the bilinear spatiotemporal model. In one embodiment, the bilinear model coefficients 126 are computed as $C = \Theta^T S B$. The bilinear spatiotemporal model is defined by the defined trajectory basis 120, the estimated shape basis 124, and the bilinear model coefficients 126.

Figure 5A:
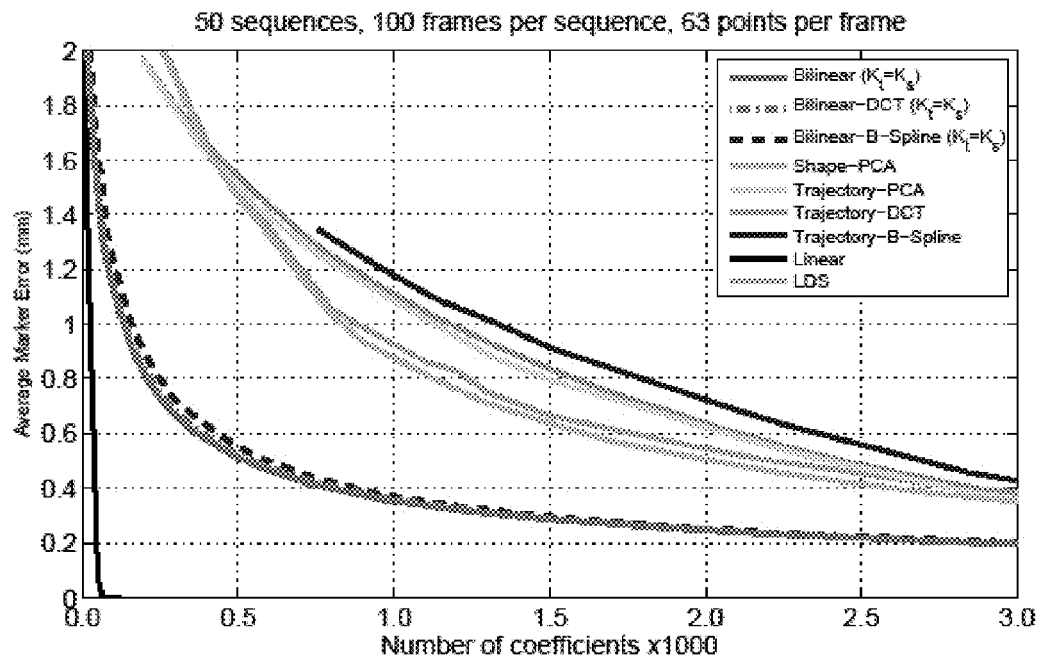
FIG. 5A is a diagram illustrating reconstruction error in marker displacement for a varying number of parameters of various spatiotemporal models for training data, according to one example embodiment of the present disclosure.

FIG. 5A is a diagram illustrating reconstruction error in marker displacement for a varying number of parameters of various spatiotemporal models for training sequence data, according to one example embodiment of the present disclosure. The reconstruction error shown in FIG. 5A is the average marker displacement computed across all frames on 50 distinct dense facial motion capture sequences of 100 frames each. The three different bilinear spatiotemporal models shown in FIG. 5A achieve the same average error as the shape (shown as Shape-PCA) and trajectory models (shown as Trajectory-PCA, Trajectory-DCT, and Trajectory-B-spline) with many fewer coefficients.

As previously explained, the bilinear spatiotemporal model is a compact representation and may also be used for generalization. Generalization is the ability of a model to describe instances outside its training set. For the same number of coefficients, the bilinear basis has far fewer model parameters than the linear spatiotemporal basis. Consequently, model estimation for the bilinear spatiotemporal model suffers relatively less from the curse of dimensionality and therefore requires fewer training examples to generalize. Because the bilinear spatiotemporal model will not learn spatio-temporal correlations that cannot be factored across space and time, it is especially attractive for applications where the data need not be temporally aligned. To generalize beyond specific spatiotemporal correlation, other types of models, such as joint linear spatiotemporal models require a large training set. Spatiotemporal models have been widely applied in analyzing, editing, synthesizing, compressing, and de-noising of time-varying spatial data. For motion capture data in particular, missing markers, occlusions, and broken trajectories are often significant issues, and spatiotemporal models are used to infer marker data across long occlusions and during dropouts.

Figure 5B:
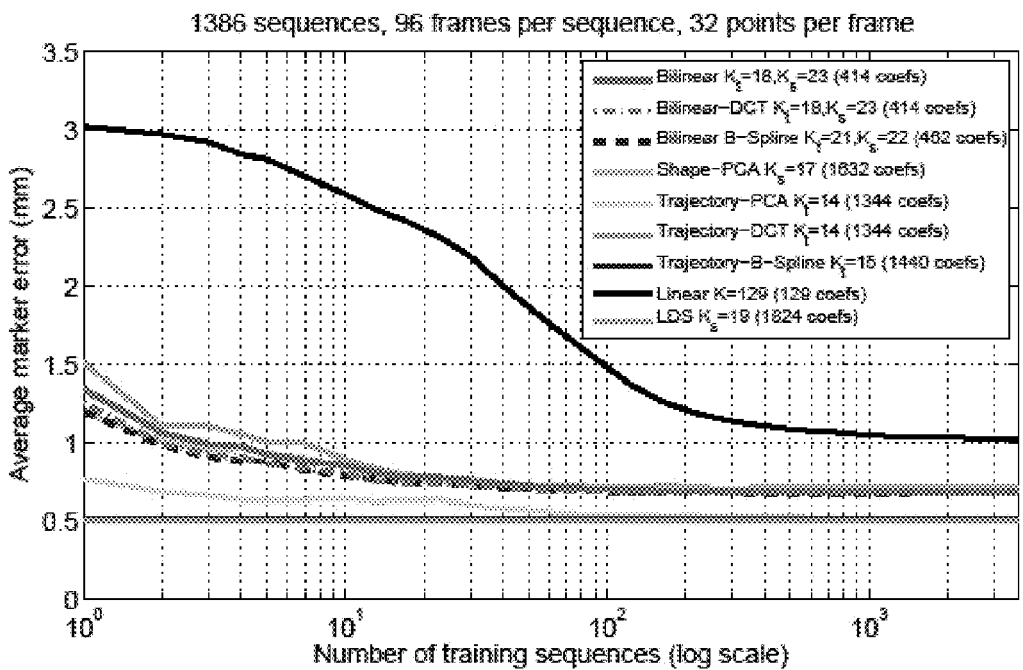
FIG. 5B is a diagram illustrating generalization error in reconstruction of test sequences for varying amounts of training data using various spatiotemporal models, according to one example embodiment of the present disclosure.

FIG. 5B is a diagram illustrating generalization error in reconstruction of unseen test sequences for varying amounts of training data using various spatiotemporal models, according to one example embodiment of the present disclosure. The various models are learned on training sequences and fit on an unseen testing set. For fair comparison, the sizes of the latent spaces for all models were chosen such that the reconstruction error on the full training set was less than 0.5 mm with minimal number of coefficients. The relative rate of improvement rather than the final error is the more relevant measure in this graph.

18 motion-capture sequences of an actor were taken and around 5,000 overlapping sub-sequences of 96 frames were extracted, each offset by 2 frames. For comparison with the linear spatiotemporal model and linear dynamic system (LDS), it was necessary to subsample the spatial resolution to only 32 points in each frame due to the large memory and computational footprint of these methods. Of these sequences, roughly two thirds were set aside for training, and the remaining third was used for testing. By varying the number of training examples used for training the models, reconstruction error was computed on the testing dataset. The results, plotted on log-scale in FIG. 5B, confirm that bilinear spatiotemporal models have superior generalization ability compared with the linear spatiotemporal model, because the bilinear spatiotemporal models show smaller errors on test sequences for the same number of training sequences. The bilinear basis estimated through iterative singular value decomposition generalizes very similarly to the conditioned bilinear basis. A large number of training sequences is necessary for the linear model to generalize.

The properties of compaction and generalization ability compete: better compaction often comes at the cost of generalization ability. Studying FIGS. 5A and 5B together shows that bilinear models provide a good tradeoff between these two properties. The linear spatiotemporal model is highly compact (at least in number of coefficients), but extremely poor in the ability to generalize. All trajectory-only models using defined basis generalize very well because the basis is chosen to suit a large number of sequences, but, for the same reason, have significantly lower compaction. Linear dynamical system and shape-only models have roughly equivalent generalization ability as bilinear models at the cost of significantly poorer compaction.

The bilinear spatiotemporal model that is conditioned with a defined trajectory basis is applicable to a range of problems which require a compact representation of motion data. In particular, the bilinear spatiotemporal model demonstrates an efficacy for analysis tasks in the motion capture pipeline: de-noising and marker labeling of raw data, gap-filling, and motion touch-up. Application programs configured to perform gap-filling and imputation, motion touch-up, and motion capture labeling and de-noising may use a bilinear spatiotemporal model to perform the analysis tasks.

Missing data in both space and time can be reconstructed well through the DCT-conditioned bilinear spatiotemporal model. Since the representation of the bilinear spatiotemporal model is compact, a few points may be enough to reconstruct an entire sequence that is incomplete, provided that a good shape basis is learned. In one embodiment, a shape basis is estimated on range-of-motion (ROM) sequences, because ROM sequences capture much of the variability of human facial expression. The bilinear spatiotemporal model may be trained on a second half of a single ROM sequence and used to impute missing data on the first half on the sequence. When marker observations are randomly discarded from the unseen first half of the sequence, the coefficients for the bilinear spatiotemporal model are computed from the remaining points. The generated bilinear spatiotemporal model yields a convincing reconstruction with an average error of around 1 mm for up to 99% missing observations.

Figure 6A:
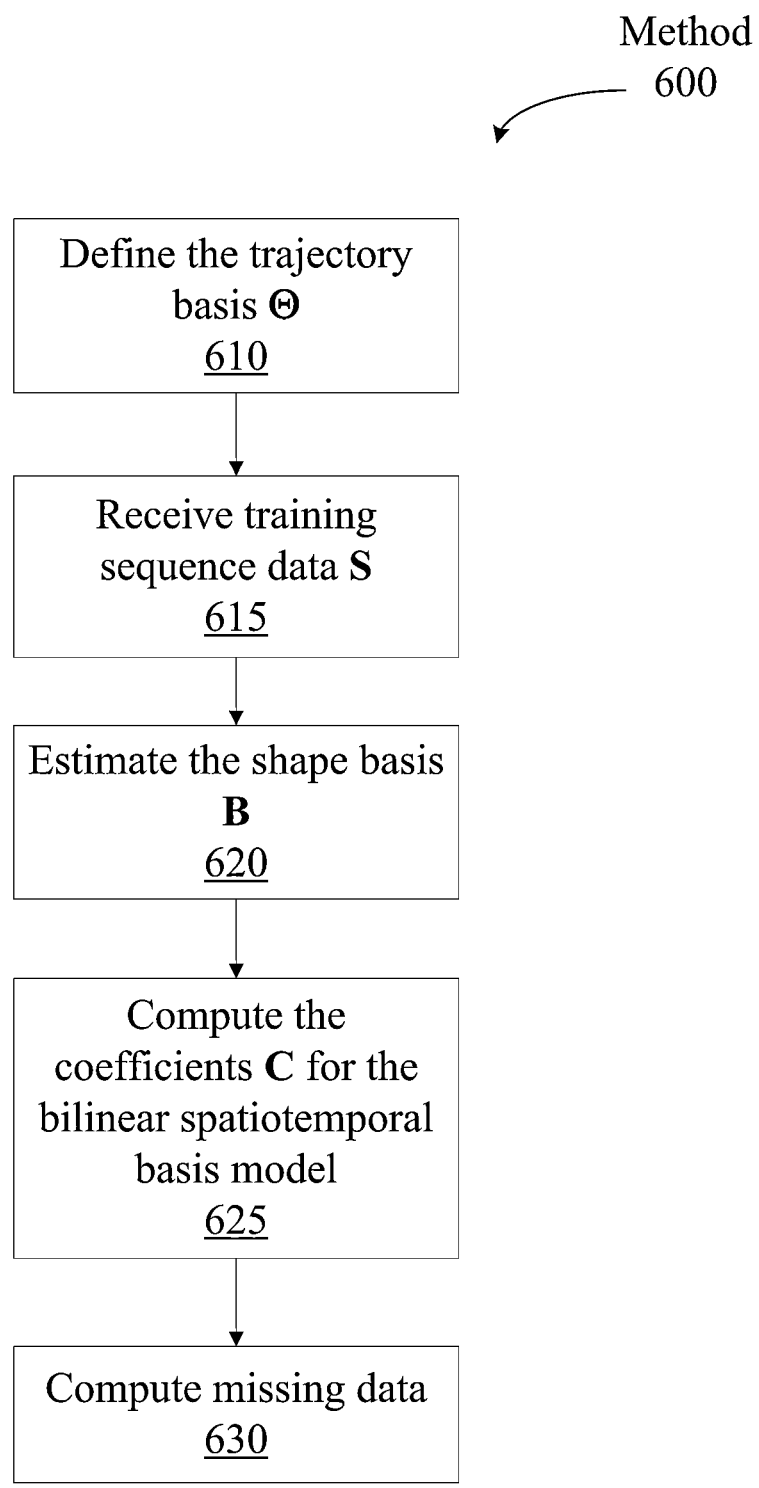
FIG. 6A is a flow diagram of method steps for performing gap-filling and imputation using a bilinear spatiotemporal model, according to one example embodiment of the present disclosure.

FIG. 6A is a flow diagram of method steps for performing gap-filling and imputation using a bilinear spatiotemporal model, according to one example embodiment of the present disclosure. Persons skilled in the art would understand that, even though the method is described in conjunction with the systems of FIGS. 1A and 1B, any system configured to perform the method steps, in any order, is within the scope of embodiments of the invention.

The method 600 begins at step 610, when a trajectory basis for a bilinear spatiotemporal model is defined, resulting in the defined trajectory basis 120. At step 615, a processing unit, such as the CPU 102, configured to execute the bilinear spatiotemporal model engine 130, receives the training sequence data 122. At step 620, the bilinear spatiotemporal model engine 130 configures the processing unit to estimate the shape basis 124 using the training sequence data 122. At step 625, the bilinear spatiotemporal model engine 130 configures the processing unit to compute the bilinear model coefficients 126 for the bilinear spatiotemporal model. The bilinear spatiotemporal model is defined by the defined trajectory basis 120, the estimated shape basis 124, and the bilinear model coefficients 126. At step 630, the bilinear spatiotemporal model engine 130 configures the processing unit using program instructions to compute missing data using the bilinear spatiotemporal model. The missing data may complete the training sequence data 122 or the missing data may be a new sequence that is consistent with the training sequence data 122.

Motion capture data often requires touch-ups or more extensive editing to adapt the recorded motions to new situations. Examples include preventing mesh interpenetrations after insertion into new environments and matching up the motions of several characters and/or objects. In these scenarios, the adapted motions should meet new constraints in spacetime while most of the original motion's dynamics and spatial features are retained.

The bilinear spatiotemporal model may be used to touch-up motion capture data when user-specified constraints are directly incorporated into a system of linear equations involving the model parameters. The solution of the system yields globally modified marker trajectories while ensuring a smooth, close fit to the original data. Because the fitting is performed in the bilinear spatiotemporal model's compact parameterization, the resulting motions match the statistics of the original data or that of the training data used to build the bilinear spatiotemporal model. A motion touch-up tool may allow plausible deformations of an entire motion capture sequence by moving only a few points and without employing any kinematic or skeletal model.

The user-specified constraints are spacetime events—a point constrained to a location at a particular moment in time—and the coefficients are those of the bilinear spatiotemporal model. Formally, given a matrix Sc with the desired position of certain points at specific frames, the global motion parameters, C, that deviate as little as possible from the original motion parameters, Co may be solved for. The solution satisfies soft-constraints on points in $S_c$:

$$\min_C \lambda \|(S_c - \Theta_c CB_c^T)\|_{W_c}^2 + \|(C_0 - C)\|_{W_0}^2.$$

The parameter $\lambda$ is chosen to be a high value so that constraints are approximately met. Vectorizing and expanding the matrix norms in the above expression results in a linear system of equations with an efficient least-squares solution that can typically be solved in real-time to allow for interactive editing, $$e(c) = \lambda (s - \Phi_c)^T W_c (s - \Phi_c) + (c_0 - c)^T W_0 (c_0 - c),$$

where c=vec(C), and as before $\Phi$=B cross-product $\Theta$. Additionally, diagonal weighting matrices have been introduced. $W_c$ controls which points in s should be constrained (e.g., if the entry corresponding to point p in frame f has weight 0, that point is unconstrained). The diagonal matrix $W_0$ allows for non-equal penalization of changes to different coefficients. For example, by increasing the weight corresponding to higher-frequency DCT components in $W_0$, changes in low-frequency coefficients will be preferred, resulting in smoother changes to the trajectories. In sum, using different weights biases the computation of the new coefficients so that a single solution is found when multiple solutions for the new coefficients exist.

Figure 6B:
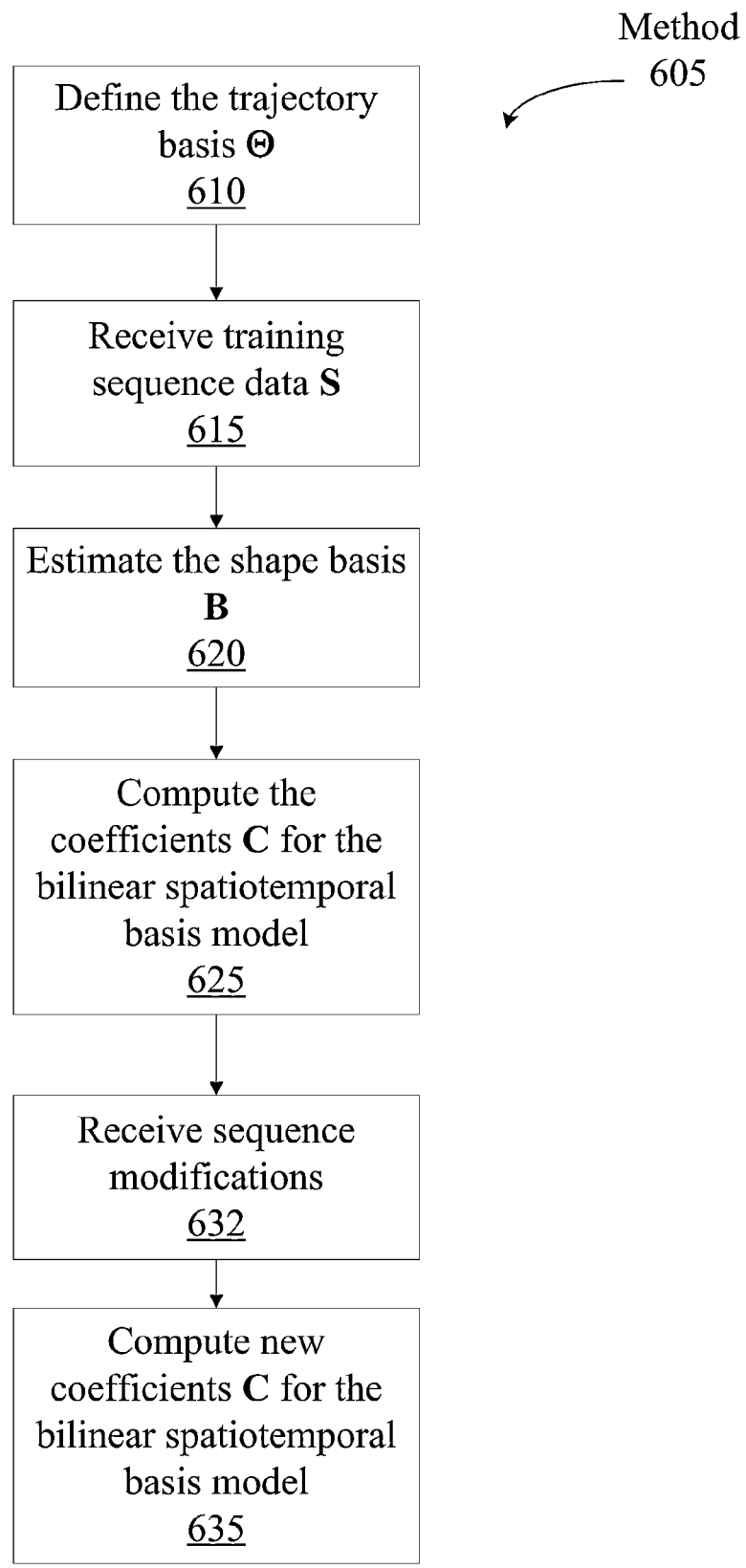
FIG. 6B is a flow diagram of method steps for performing motion touch-up using a bilinear spatiotemporal model, according to one example embodiment of the present disclosure.

FIG. 6B is a flow diagram of method steps for performing motion touch-up using a bilinear spatiotemporal model, according to one example embodiment of the present disclosure. Persons skilled in the art would understand that, even though the method is described in conjunction with the systems of FIGS. 1A and 1B, any system configured to perform the method steps, in any order, is within the scope of embodiments of the invention.

The method 605 begins at step 610, when a trajectory basis for a bilinear spatiotemporal model is defined, resulting in the defined trajectory basis 120. At step 615, a processing unit, such as the CPU 102, configured to execute the bilinear spatiotemporal model engine 130, receives the training sequence data 122. At step 620, the bilinear spatiotemporal model engine 130 configures the processing unit to estimate the shape basis 124 using the training sequence data 122. At step 625, the bilinear spatiotemporal model engine 130 configures the processing unit to compute the bilinear model coefficients 126 for the bilinear spatiotemporal model. The bilinear spatiotemporal model is defined by the defined trajectory basis 120, the estimated shape basis 124, and the bilinear model coefficients 126.

At step 632, the bilinear spatiotemporal model engine 130 receives sequence modifications, e.g., user-specified constraints. At step 635, the bilinear spatiotemporal model engine 130 configures the processing unit to compute new model coefficients 126 using the bilinear spatiotemporal model.

Reconstruction using motion capture systems often requires tedious post-processing for data cleanup, to connect broken trajectories, impute missing markers, correct mislabeled markers and de-noise trajectories. The bilinear spatiotemporal model may be used by an application program to simultaneously label, de-noise and impute missing points, to drastically reduce the time required for cleanup, while generating reconstructions qualitatively and quantitatively similar to those by industry professionals. The bilinear spatiotemporal model representation is used to compute marker labels. Given the shape and trajectory bases, the estimation of the coefficients and marker labels is interdependent and may be iteratively estimated using the Expectation Maximization (EM) algorithm.

The observed 3D coordinates of the $p^{th}$ marker in frame f is $X_f^p = \hat{X}_f^p + e$, where $e \sim \mathcal{N}(0, \sigma^2 I)$ is a measurement error, and X is the true value of $\hat{X}_f^p$ and $\sigma$ denotes the standard deviation of the error. A label $l_f^p \in \{1, \ldots, P\}$ is assigned to each marker $X_f^p$ associating it to a unique trajectory, such that the rearranged matrix $S = \Theta CB^T$. The goal of the EM algorithm is to estimate both the set of hidden variables $l_f^p$; as well and the bilinear spatiotemporal model parameters, C and a.

In the expectation step, probabilistic labeling of the spacetime points given an initialization of the coefficients, C, of the bilinear spatiotemporal model is estimated. In the maximization step, the probabilistic labeling is used to estimate the maximum likelihood estimate of C. The running time of the algorithm can be significantly improved by making a hard assignment of the unlabeled points, instead of doing this probabilistically. This is sometimes referred to as the hard-EM algorithm. This simplification reduces the expectation step to estimating imputation using equation, $\hat{S} = \Theta CB^T$ and assigning labels to raw data points based on the label of the closest imputed point in each frame. In the maximization step, the raw points are arranged into the structure matrix S. The coefficients are then estimated as $C = \Theta^T SB$.

To initialize the marker labels for the EM algorithm, the smoothness of trajectories is exploited to propagate labels from one frame to the next. The coefficients of the bilinear spatiotemporal model are estimated using the first N frames, and the marker positions at frame N+1 are imputed by using the analytical expression of the DCT trajectory basis to extend the sequence length during reconstruction. The first frame is initialized by assigning arbitrary labels to each point in a user selected frame containing all markers. Once an initial estimate of the marker labels is known, the shape basis B and the coefficients C can be estimated. The estimated B and C may be used to initialize the EM algorithm as described above.

To guard against errors in the labeling biasing the estimate of the shape basis, an ordering constraint may be used to find mislabeled data. Errors in the initial labeling can often be identified because for each mislabeled point, at least one of the triangles in the triangulated mesh containing that point as a vertex switches the direction of its normal vector. Therefore, by comparing the direction of a normal vector of a triangle in the current frame with the one in the previous frame, the consistency of labeling can be determined. This filtering can be used to identify frames which do not have labeling errors; to ensure correct estimation, the shape basis, B, is learned using only these frames.

Figure 6C:
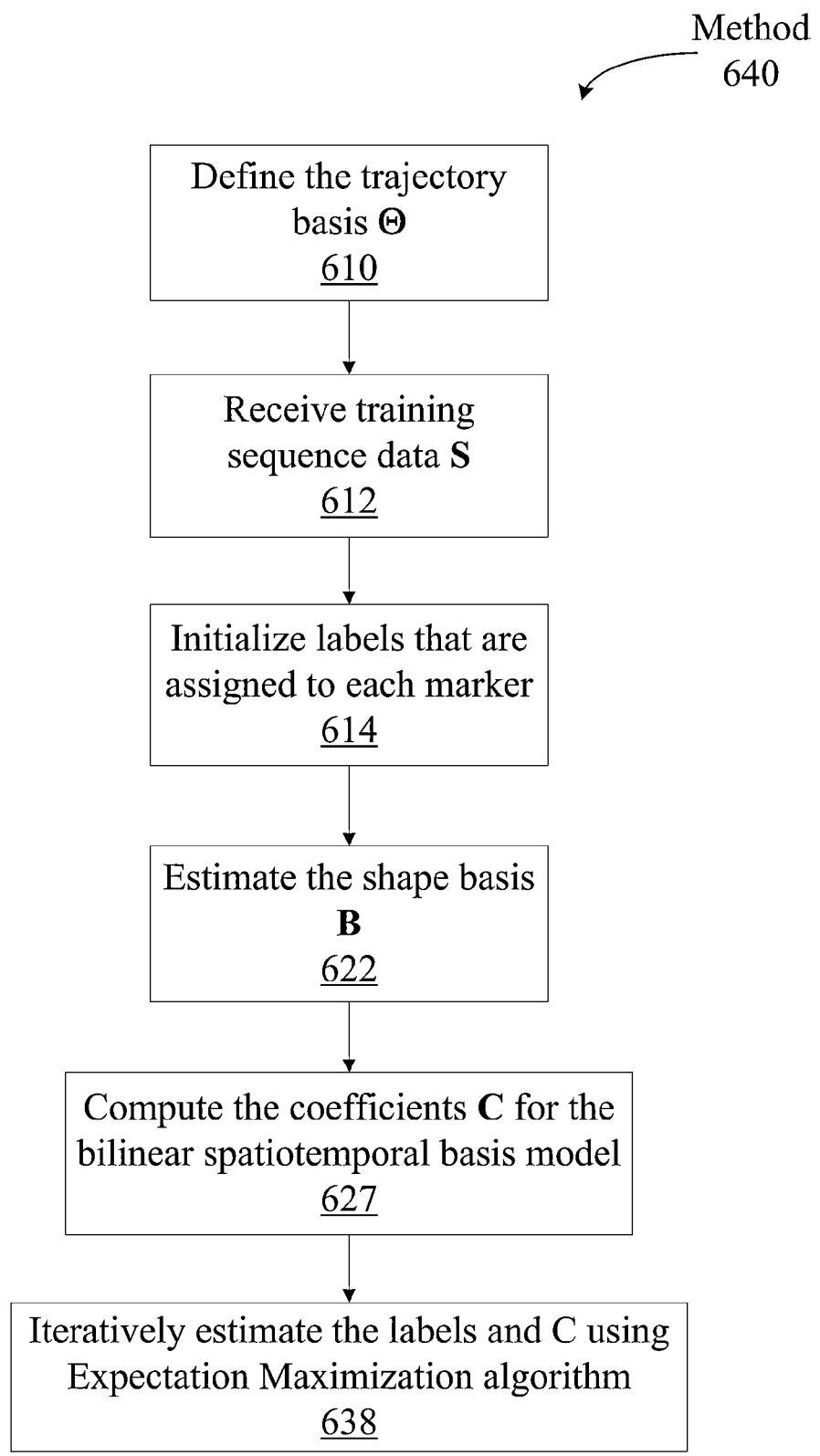
FIG. 6C is a flow diagram of method steps for performing motion capture labeling and de-noising using a bilinear spatiotemporal model, according to one example embodiment of the present disclosure.

FIG. 6C is a flow diagram of method steps for performing motion capture labeling and de-noising using a bilinear spatiotemporal model, according to one example embodiment of the present disclosure. Persons skilled in the art would understand that, even though the method is described in conjunction with the systems of FIGS. 1A and 1B, any system configured to perform the method steps, in any order, is within the scope of embodiments of the invention.

The method 640 begins at step 610, when a trajectory basis for a bilinear spatiotemporal model is defined, resulting in the defined trajectory basis 120. At step 612, a processing unit, such as the CPU 102, configured to execute the bilinear spatiotemporal model engine 130, receives the training sequence data 122. At step 614 the bilinear spatiotemporal model engine 130 configures the processing unit to initialize labels that are assigned to each marker.

At step 622, the bilinear spatiotemporal model engine 130 configures the processing unit to estimate the shape basis 124 using the training sequence data 122. At step 627, the bilinear spatiotemporal model engine 130 configures the processing unit to compute the bilinear model coefficients 126 for the bilinear spatiotemporal model.

At step 638, the labels and bilinear model coefficients 126 are estimated using the expectation maximization algorithm. The final bilinear spatiotemporal model is defined by the defined trajectory basis 120, the estimated shape basis 124, and the bilinear model coefficients 126.

According to embodiments described herein, the bilinear spatiotemporal basis is a model that simultaneously exploits spatial and temporal regularity while maintaining the ability to generalize well to new sequences. The bilinear spatiotemporal model can be interpreted as representing the data as a linear combination of spatiotemporal sequences consisting of shape modes oscillating over time at key frequencies. This factorization allows the use of analytical, defined functions to represent temporal variation (e.g., B-Splines or the Discrete Cosine Transform) resulting in more efficient model representation and estimation. The bilinear spatiotemporal model may be applied to natural spatiotemporal phenomena, including face, body, and cloth motion data. The bilinear spatiotemporal model may also be applied to a number of graphics tasks including labeling, gap-filling, de-noising, and motion touch-up. In sum, the bilinear spatiotemporal model provides a compact representation of the spatiotemporal data that may be generalized and used to accurately predict additional spatiotemporal data.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method of generating a bilinear spatiotemporal basis model, comprising:
    providing a trajectory basis for the bilinear spatiotemporal basis model;
    receiving three-dimensional spatiotemporal data for a training sequence;
    estimating a shape basis for the bilinear spatiotemporal basis model using the three-dimensional spatiotemporal data; and
    computing coefficients common to the trajectory basis and the shape basis for the bilinear spatiotemporal basis model using the trajectory basis and the shape basis, wherein each of the coefficients represents a weight of an outer product of a respective trajectory basis vector and a respective shape basis vector.

2. The method of claim 1, further comprising applying the bilinear spatiotemporal basis model to generate additional three-dimensional spatiotemporal data.

3. The method of claim 2, further comprising:
    modifying a position in three-dimensional space corresponding to a point within the additional three-dimensional spatiotemporal data; and
    computing new coefficients for the bilinear spatiotemporal basis model using the trajectory basis and the shape basis.

4. The method of claim 3, further comprising using weights to bias the computation of the new coefficients.

5. The method of claim 2, further comprising:
    receiving virtual markers corresponding to points in three-dimensional space within the additional three-dimensional spatiotemporal data;
    initializing labels that are assigned to the virtual markers;
    iteratively estimating the labels and computing new coefficients for the bilinear spatiotemporal basis model using an expectation maximization algorithm.

6. The method of claim 2, wherein the additional three-dimensional spatiotemporal data is a new sequence.

7. The method of claim 1, wherein the training sequence includes multiple frames that each include a portion of the three-dimensional spatiotemporal data.

8. The method of claim 1, wherein the three-dimensional spatiotemporal data is incomplete; and further comprising computing missing three-dimensional spatiotemporal data.

9. The method of claim 1, wherein the trajectory basis comprises a discrete cosine transform.

10. The method of claim 1, wherein the trajectory basis comprises a B-spline.

11. The method of claim 1, wherein the trajectory basis comprises a linear basis that is produced from the three-dimensional spatiotemporal data.

12. The method of claim 1, wherein the bilinear spatiotemporal basis model is linear in coefficients and a bilinear factorization of a basis into spatial and temporal variations.

13. A non-transitory computer-readable storage medium storing instructions that, when executed by a processor, cause a computer system to perform an operation for generating a bilinear spatiotemporal basis model, the operation comprising:
    providing a trajectory basis for the bilinear spatiotemporal basis model;
    receiving three-dimensional spatiotemporal data for a training sequence;

estimating a shape basis for the bilinear spatiotemporal basis model using the three-dimensional spatiotemporal data; and computing coefficients common to the trajectory basis and the shape basis for the bilinear spatiotemporal basis model using the trajectory basis and the shape basis, wherein each of the coefficients represents a weight of an outer product of a respective trajectory basis vector and a respective shape basis vector.

14. The computer-readable storage medium of claim 13, further comprising applying the bilinear spatiotemporal basis model to generate additional three-dimensional spatiotemporal data.

15. The computer-readable storage medium of claim 13, wherein the three-dimensional spatiotemporal data is incomplete; and further comprising computing missing three-dimensional spatiotemporal data.

16. The computer-readable storage medium of claim 13, wherein the trajectory basis comprises a discrete cosine transform.

17. A system for generating a bilinear spatiotemporal basis model, the system comprising:
   a memory configured to store three-dimensional spatiotemporal data for a training sequence and coefficients for the bilinear spatiotemporal basis model; and
   a processing unit coupled to the memory and configured to:
      provide a trajectory basis for the bilinear spatiotemporal basis model;
      receive the three-dimensional spatiotemporal data for the training sequence;
      estimate a shape basis for the bilinear spatiotemporal basis model using the three-dimensional spatiotemporal data; and
      compute coefficients common to the trajectory basis and the shape basis for the bilinear spatiotemporal basis model using the trajectory basis and the shape basis, wherein each of the coefficients represents a weight of an outer product of a respective trajectory basis vector and a respective shape basis vector.

18. The system of claim 17, wherein the processing unit is further configured to apply the bilinear spatiotemporal basis model to generate additional three-dimensional spatiotemporal data.

19. The system of claim 18, wherein the processing unit is further configured to:
   modify a position in three-dimensional space corresponding to a point within the additional three-dimensional spatiotemporal data; and
   compute new coefficients for the bilinear spatiotemporal basis model using the trajectory basis and the shape basis.

20. The system of claim 17, wherein the three-dimensional spatiotemporal data is incomplete; and the processing unit is further configured to compute missing three-dimensional spatiotemporal data.

21. The system of claim 17, wherein the trajectory basis comprises a discrete cosine transform.

* * * * *

UNITED STATES PATENT AND TRADEMARK OFFICE
CERTIFICATE OF CORRECTION

PATENT NO. : 9,041,718 B2
APPLICATION NO. : 13/425369
DATED : May 26, 2015
INVENTOR(S) : Matthews et al.

It is certified that error appears in the above-identified patent and that said Letters Patent is hereby corrected as shown below:

In the specification

Column 7, Line 45, please delete " $S = \Sigma_i \Sigma_j c_j^i \theta i b_j^T$ ."

and insert -- $S = \Sigma_i \Sigma_j c_j^i \theta i \, \mathbf{b}_j^T$ -- therefor;

Column 9, Line 47, please delete " $C = \underset{C}{\arg\min} \| (S - \Theta C B^T) \|_F^2$ "

and insert -- $C = \underset{C}{\arg\min} \| (S - \Theta C B^T) \|_F^2$ -- therefor;

Column 9, Line 53, please delete " $C = \Theta^T S (B^T)^+$ "

and insert -- $C = \Theta^- S(B^T)^+$ -- therefor;

Column 10, Line 9, please delete " $\Pi = [\hat{S}_1^T, \hat{A}_2^T, \ldots, \hat{S}_N^T]^T$ , "

and insert -- $\Pi = [\hat{S}_1^T, \hat{S}_2^T, \ldots, \hat{S}_N^T]^T$ -- therefor;

In the specification

Signed and Sealed this
Third Day of November, 2015

Michelle K. Lee
*Director of the United States Patent and Trademark Office*

CERTIFICATE OF CORRECTION (continued)
U.S. Pat. No. 9,041,718 B2

Column 10, Line 17, please delete

"$\operatorname*{argmin}_{B} \|\Theta\,\Theta^{+}S + \Theta^{+}A^{\perp} - \Theta\Theta^{+}S(B^{T})^{+}B^{T}\|_{F}^{2}$"

and insert -- $\underset{B}{\arg\min} \|\Theta\,\Theta^{+}S + \Theta^{-}A^{\perp} - \Theta\Theta^{+}S(B^{T})^{-}B^{T}\|_{F}^{2}$ -- therefor;

Column 14, Line 22, please delete "X" and insert -- $X_f^p$ -- therefor;

Column 14, Line 23, please delete "$1_f^p \in \{1, \ldots, P\}$"

and insert -- $l_f^p \in \{1, \ldots, P\}$ -- therefor.